United States Patent [19]
Burnell et al.

[11] Patent Number: 5,479,774
[45] Date of Patent: Jan. 2, 1996

[54] COMBUSTION CHAMBER ASSEMBLY IN A GAS TURBINE ENGINE

[75] Inventors: Anthony D. Burnell, Bristol, England; Peter D. Price, Newport, Wales

[73] Assignee: Rolls-Royce plc, London, England

[21] Appl. No.: 137,129

[22] PCT Filed: Apr. 23, 1992

[86] PCT No.: PCT/GB92/00745

§ 371 Date: Jan. 24, 1994

§ 102(e) Date: Jan. 24, 1994

[87] PCT Pub. No.: WO92/19915

PCT Pub. Date: Nov. 12, 1992

[30] Foreign Application Priority Data

Apr. 30, 1991 [GB] United Kingdom .................... 9109278

[51] Int. Cl.⁶ ..................................................... F02C 3/14
[52] U.S. Cl. ........................................... 60/39.36; 60/756
[58] Field of Search .................. 60/39.36, 39.37, 60/756, 747, 752

[56] References Cited

U.S. PATENT DOCUMENTS

| | | | |
|---|---|---|---|
| 2,545,495 | 3/1951 | Sforzini | 60/756 |
| 2,682,363 | 6/1954 | Lombard et al. | 60/39.37 |
| 2,867,982 | 1/1959 | Clarke et al. | |
| 3,512,359 | 5/1973 | Pierce | 60/39.36 |
| 4,222,230 | 9/1980 | Bobo et al. | 60/39.36 |
| 4,689,961 | 9/1987 | Stratton | |
| 4,843,825 | 7/1989 | Clark | |
| 5,154,059 | 10/1992 | Keller | 60/747 |
| 5,285,635 | 2/1994 | Savelli et al. | 60/747 |
| 5,331,814 | 7/1994 | Sandelis | 60/747 |

FOREIGN PATENT DOCUMENTS

| | | | |
|---|---|---|---|
| 0153842 | 2/1985 | European Pat. Off. | |
| 0401529 | 5/1990 | European Pat. Off. | |
| 1008197 | 1/1950 | France | |
| 1110588 | 10/1954 | France | |
| 662764 | 12/1951 | United Kingdom | |
| 741489 | 12/1955 | United Kingdom | |
| 1021588 | 3/1966 | United Kingdom | 60/39.37 |
| 1150344 | 4/1969 | United Kingdom | 60/747 |
| 2020370A | 6/1979 | United Kingdom | |

*Primary Examiner*—Timothy S. Thorpe
*Attorney, Agent, or Firm*—Oliff & Berridge

[57] ABSTRACT

Overrich regions of fuel mixture in the combustion chamber of a gas turbine engine are dispersed by a jet of air directed into the region. Plumes of fuel/air mixture from adjacent airspray burners overlap to create overrich regions which tend to produce soot. Aligned apertures in the head of the combustion chamber direct jets of high pressure air at the regions with as little loss of momentum as possible, to disperse them. The apertures may be in the form of slots to provide fan-shaped jets.

9 Claims, 3 Drawing Sheets

COMBUSTION CHAMBER ASSEMBLY IN A GAS TURBINE ENGINE

BACKGROUND OF THE INVENTION

1. Field of the Invention

This invention relates to a combustion chamber assembly in a gas turbine engine.

2. Description of Related Art

One configuration of combustor chamber assembly includes an annular combustion chamber with a number of airspray burners arranged within it. Each burner introduces a mixture of fuel and air into the combustion chamber. The fuel droplets or vapour extend into the chamber as a plume. At a point downstream of the burner the plumes produced by adjacent burners overlap and create pockets particularly rich in fuel. In such regions combustion of the fuel is incomplete and soot particles are formed. This is an undesirable effect for both the engine and its operating environment. It is an object of the present invention to provide means for suppressing the formation of soot by promoting complete combustion of the fuel.

SUMMARY OF THE INVENTION

This invention therefore provides a method and apparatus for directing a jet of air into the plume overlap region to disperse fuel-rich mixture therein.

BRIEF DESCRIPTION OF THE DRAWINGS

The invention will now be described in greater detail with reference, by way of example only, to an arrangement illustrated in the accompanying drawings.

DETAILED DESCRIPTION OF PREFERRED EMBODIMENTS

Figure 1:
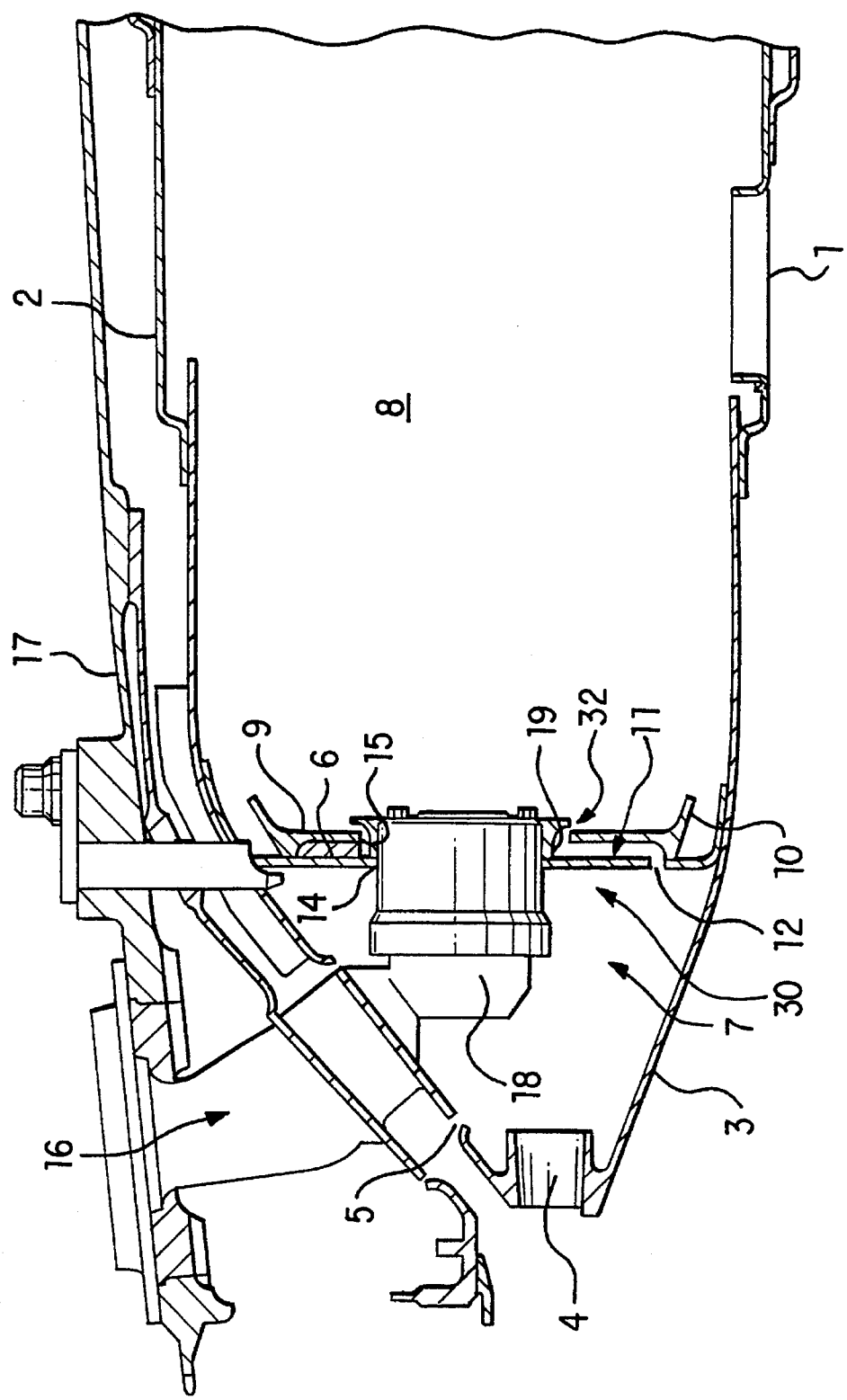
FIG. 1 shows a cross-sectioned view of an annular combustion chamber assembly and plenum region separated by an annular heat shield

An annular combustion chamber assembly as in FIG. 1 comprises an annular inner casing 1 and a concentric outer casing 2. At their upstream ends the inner casing 1 and the outer casing 2 converge to form the head of the chamber in the shape of an annular cowl 3. The cowl is formed with a plurality of openings 4 at its foremost point. In operation, openings 4 create a source of high pressure air because they receive a flow of air from the high pressure compressor. The cowl 3 has a plurality of further openings circumferentially distributed in the outer wall.

An annular end wall 30 includes bulkhead 6 extending between the inner casing 1 and the outer casing 2, downstream of the cowl 3. The bulkhead 6 and the cowl 3 define a plenum region 7 in the head of the chamber. Downstream, the bulkhead 6, inner casing 1 and outer casing 2 define a combustion chamber 8. The downstream face of the bulkhead 6 is protected from the high temperatures generated in the combustion chamber 8 during operation by an annular heat shield 9 which is secured to the bulkhead 6.

In one embodiment (FIG. 1), heatshield 9 comprises a single continuous ring with a plurality of raised ridges 10 extending from the upstream face and contacting with the downstream face of the bulkhead 6. A network of passages 11 is thus defined between the bulkhead 6 and the heat shield 9. The bulkhead defines a plurality of metering holes 12 which communicate between the plenum region 7 and the network of passages 11. The raised ridges define a plurality of openings 32 at the radially inner and outer edges of the heat shield annulus 9, such that the passages 11 communicate with the combustion chamber 8. In an alternative configuration (FIG. 2) the heat shield 9 comprises a plurality of sector-shaped segments 13, as in FIG. 2. The abutting edges of adjacent segments are aligned radially with respect to the longitudinal axis 22 of the engine. This configuration would also provide raised ridges 10 on the upstream faces of the segments 13 and hence a network of passages 11 between the bulkhead 6 and the heat shield 9.

The bulkhead 6 also defines a plurality of first entry apertures 14 distributed at regular intervals around the annulus. The heat shield 9 defines a plurality of slightly larger first exit apertures 15, positioned to line up with first entry apertures defined by the bulkhead 6.

The combustion chamber 8 receives therein a plurality of airspray burners. Each airspray burner comprises a hollow arm 16, secured to the engine outer casing 17 and extending inwards through an opening 5 in the cowl 3 into the plenum region 7. A generally cylindrical hollow head 18 extends distal to the arm 16 through first entry apertures 14 in the bulkhead 6 and first exit apertures 15 in the heat shield 9 to encroach slightly into the combustion chamber 8. The downstream end of the head 18 is fitted tightly into a ring 19. The ring 19 has a lip at its downstream end which locates on the heat shield 9.

When the engine is in use a portion of the flow of air from the high pressure compressor enters the plenum region 7 through the openings 4 in the cowl 3. Some portion of the air flowing into the plenum region 7 enters the network of passages 11 through the metering holes 12 in the bulkhead 6. The air flowing through the passages 11 cools the heat shield 9 and eventually passes into the combustion chamber 8 through openings 32 at the inner and outer edges of the heat shield annulus 9.

Some further portion of the high pressure air flowing into the plenum region 7 enters the head 18 of the airspray burner. The airspray burner swirls and mixes the flow of air with fuel supplied through the hollow arm 16 and discharges the mixture into the combustion chamber 8. The mixture spreads into the combustion chamber 8 as a plume. At some point downstream adjacent plumes overlap to create fuel-rich pockets. Within these pockets combustion of the fuel is incomplete and soot particles are formed. However, the invention provides means for directing a jet of air into the overlap region to disperse the fuel-rich mixture and encourage complete combustion.

Figure 2:
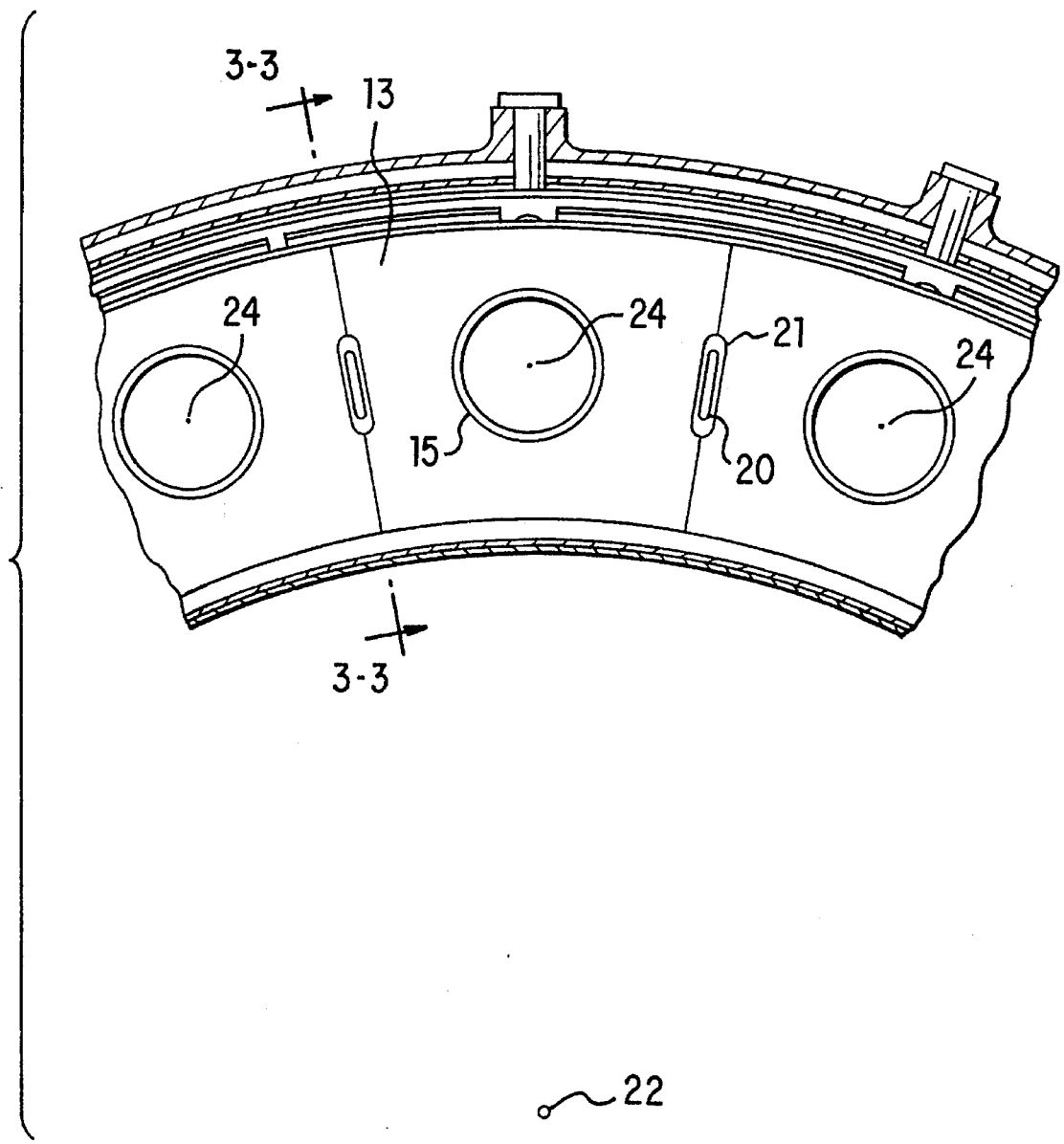
FIG. 2 shows a second embodiment of the annular heat shield wherein the heat shield includes a plurality of abutting segments, with only a portion of the abutting segments illustrated
Figure 3:
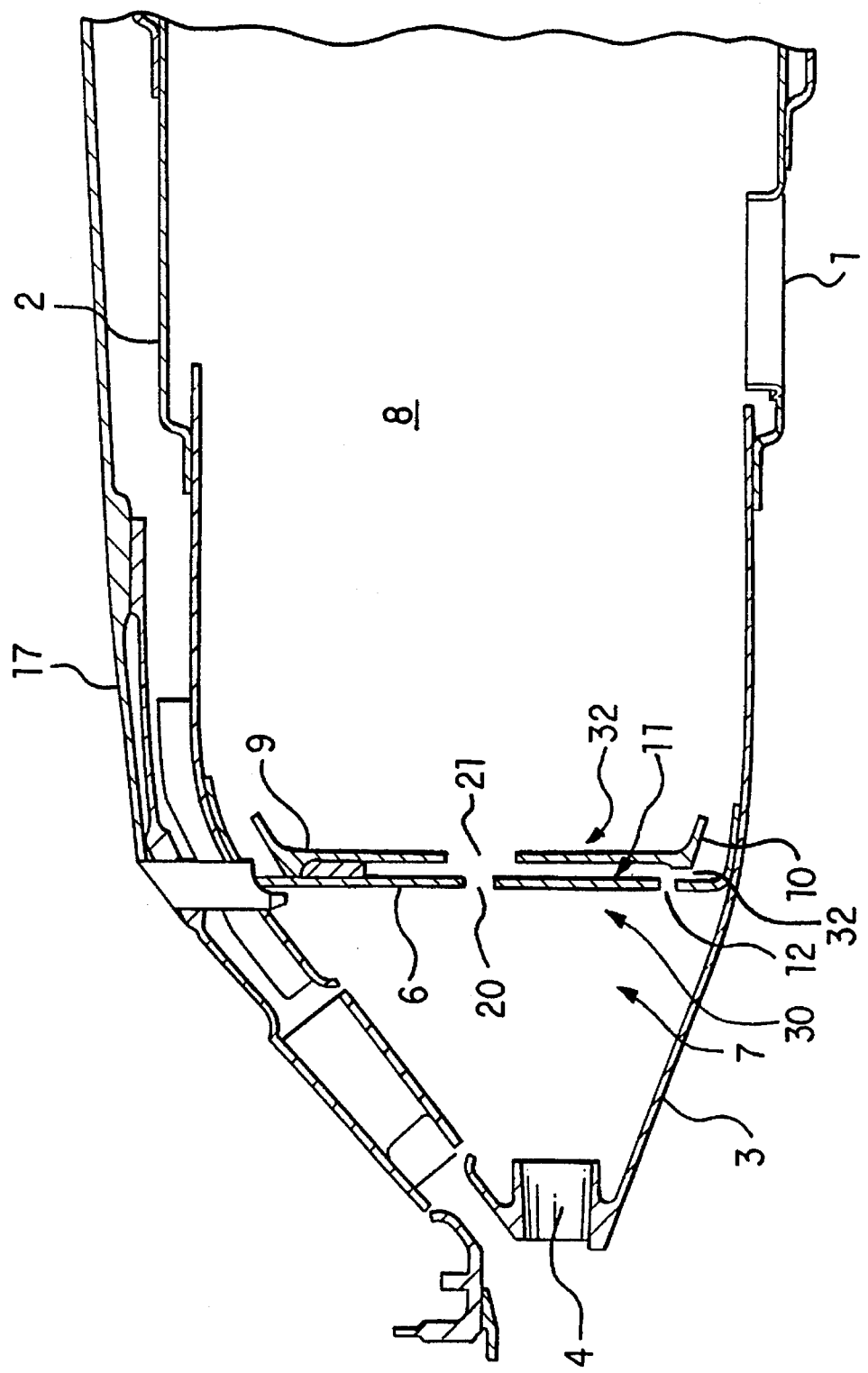
FIG. 3 shows a cross sectional view of an annular combustion chamber assembly along line 3—3.

According to the preferred embodiment of the invention a plurality of second entry apertures 20, preferably a plurality of slots 20, are defined by the bulkhead 6 and a corresponding plurality of second exit apertures 21, preferably a plurality of slots 21 are defined by the heat shield 9, as in FIGS. 2–3. Slots 20 and 21 are radially aligned with respect to the longitudinal axis 22 of the engine. Slots 21 in the heat shield 9 are aligned with but slightly larger than slots 20 in the bulkhead 6, such that a clear unobstructed path is provided between the plenum region 7 and the combustion chamber 8. Each slot 20 and 21 is positioned equidistant from two adjacent airspray burner heads 18. Furthermore each slot intersects a straight line between the center points 24 of the two adjacent airspray burner heads 18 which flank the slot. In the embodiment of FIG. 1, the slots 20,21 are formed in the bulkhead 6 and heat shield 9, respectively. In the embodiment of FIG. 2 where the heat shield 9 includes abutting segments 13, a portion of each of the second exit aperture (slot 21) is formed in an edge of the segment 13 so that a complete slot 21 is formed by abutting adjacent segments 13.

When the engine is in use, that portion of the high pressure air entering the plenum region 7 which does not enter the airspray burner heads 18 or the cooling passages 11 flows instead through slots 20 and 21 directly into the combustion chamber 8. The slots 20 and 21 provide a direct unobstructed path from the plenum region 7 into the combustion chamber 8, such that the air flow therethrough does not suffer significant momentum losses. The size and shape of slots 20 and 21 ensure air passing therethrough enters the combustion chamber in the form of fan-shaped jets. Furthermore, the position of slots 20 and 21 relative to airspray burner heads 18 ensures the jets are directed accurately into plume overlap regions. Consequently, jets impinge upon overlap regions and retain sufficient energy to have the necessary dispersal effect on the fuel-rich mixture therein. Thus, the jets of high momentum air promote complete combustion of fuel and suppress formation of soot particles.

We claim:

1. A combustion chamber for a gas turbine engine comprising:
    a combustion chamber having an annular end wall, the end wall defining an upstream end of the chamber and having first entry and exit apertures and second entry and exit apertures;
    a plurality of fuel injector means, associated with the first entry and exit apertures, for introducing plumes of a fuel and air mixture into the combustion chamber, the plumes being capable of overlapping; and
    a source of high pressure air on the upstream side of the end wall communicating with the first and second entry and exit apertures, the second entry and exit apertures directing the high pressure air into and dispersing overlapped plumes;
    wherein the end wall comprises an internal bulkhead and a heat shield spaced from the bulkhead, the second entry apertures are located in the bulkhead and the second exit apertures are located in the heat shield co-axially aligned with the second entry apertures in the bulkhead.

2. A combustion chamber according to claim 1 wherein said combustion chamber is of an annular configuration defined by an inner circumferential wall and an outer circumferential wall and the annular end wall, and the injector means for introducing fuel-air mixture are spaced apart circumferentially around the chamber.

3. A combustion chamber according to claim 1 wherein the second entry and exit apertures are slots such that said jets of air issuing from said slots are fan-shaped.

4. A combustion chamber according to claim 3 wherein said slots are radially aligned with a longitudinal axis of the engine.

5. A combustion chamber according to claim 1, wherein the heat shield comprises a plurality of circumferentially abutting segments, each segment having edges abutting edges of an adjacent segment, each edge including a portion of a second exit aperture so that a complete second exit aperture is formed by abutment of adjacent segments.

6. A combustion chamber according to claim 5, wherein said second entry and exit apertures are radially aligned with the longitudinal axis of the engine.

7. A combustion chamber according to claim 1, wherein the second apertures are equidistant from adjacent first apertures.

8. A combustion chamber according to claim 7, wherein the second entry and exit apertures intersect a straight line between centers of the first entry and exit apertures.

9. A combustion chamber according to claim 1, wherein the second entry aperture is smaller than the second exit aperture.

\* \* \* \* \*